United States Patent
Ishii et al.

(10) Patent No.: US 7,285,944 B2
(45) Date of Patent: Oct. 23, 2007

(54) DC-DC CONVERTER

(75) Inventors: Takuya Ishii, Osaka (JP); Takashi Ryu, Kyoto (JP); Hirohisa Tanabe, Kyoto (JP); Masaaki Koto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/523,699

(22) Filed: Sep. 20, 2006

(65) Prior Publication Data

US 2007/0063685 A1 Mar. 22, 2007

(30) Foreign Application Priority Data

Sep. 21, 2005 (JP) ............................. 2005-273513

(51) Int. Cl.
*G05F 1/40* (2006.01)
(52) U.S. Cl. ...................................... 323/288; 323/284
(58) Field of Classification Search ................ 323/222, 323/282, 284, 285, 288, 290; 320/166
See application file for complete search history.

(56) References Cited

U.S. PATENT DOCUMENTS 5,436,550 A * 7/1995 Arakawa .................... 323/222
5,977,756 A * 11/1999 Nagata et al. .............. 323/282
6,489,758 B2 * 12/2002 Moriconi et al. ........... 323/288
6,624,619 B2 * 9/2003 Fujita et al. ................ 323/288

FOREIGN PATENT DOCUMENTS

JP 2004-64994 A 2/2004

* cited by examiner

*Primary Examiner*—Jessica Han
(74) *Attorney, Agent, or Firm*—McDermott Will & Emery LLP

(57) ABSTRACT

A DC-DC converter for converting an input DC voltage to an output DC voltage has a switch element which is turned ON/OFF by a drive signal, a reference voltage source for outputting a first reference voltage when the switch element is ON or outputting a second reference voltage when the switch element is OFF, a capacitive element having one terminal connected to the reference voltage source, a charge/discharge circuit for discharging the capacitive element when the switch element is ON and charging the capacitive element when the switch element is OFF, a switch circuit for short-circuiting the capacitive element when the switch element is turned ON and OFF, and a comparison circuit for comparing the output DC voltage or a voltage at which the output DC voltage is detected with a voltage at the other terminal of the capacitive element and generating the drive signal.

6 Claims, 4 Drawing Sheets

DC-DC CONVERTER

BACKGROUND OF THE INVENTION

The present invention relates to a DC-DC converter which supplies a stable output DC voltage in rapid response to a change in input/output conditions.

In recent years, as electronic equipment represented by mobile equipment has increased in functionality, the power consumption thereof has also increased. To use the battery of such electronic equipment for longer hours, the increase in the power consumption thereof should be suppressed. For this purpose, a technology termed power management that supplies power only to a currently operating circuit in electronic equipment and stops a circuit which need not be operated has been used commonly. A DC-DC converter which supplies a DC voltage to such electronic equipment is requested to rapidly respond to a change in output conditions.

For a DC-DC converter which is excellent in transient response characteristic, a known technology termed hysteresis control has been used conventionally. The hysteresis control is a self-excited control method which holds an output DC voltage within a hysteresis width set by a hysteresis comparison circuit. Since a feedback system using a typical error amplifier is not provided, a transient response time is dependent only on the delay time between the hysteresis comparison circuit and a driving circuit for a switch element. On the other hand, an output ripple voltage dependent on the equivalent series resistance (hereinafter referred to as ESR) of an output capacitor corresponds to a hysteresis width so that a switching frequency is directly proportional to the ESR. As a result, the problem is encountered that the use of an output capacitor with a low ESR lowers the switching frequency.

As a solution to the problem of the hysteresis control mentioned above, a technology as disclosed in, e.g., Patent Document (see Japanese Laid-Open Patent Publication No. 2004-64994) has been proposed. The technology superimposes a switching waveform on the waveform of an output DV voltage from a detection unit for the output DC voltage to increase the amplitude of the ripple voltage only in the detection unit, thereby preventing the lowering of the switching frequency and reducing the output ripple voltage. FIG. 6 is a view showing a circuit structure of a conventional DC-DC converter disclosed in Patent Document described above.

The conventional DC-DC converter shown in FIG. 6 includes: an input DC voltage source 10 for supplying an input DC voltage Vi; a switch element 11 and a diode 12 connected in series to each other in parallel relation to the input DC voltage source 10; an inductor 13 connected between the output of the DC-DC converter and the connecting point between the switch element 11 and the diode 12; an output capacitor 14 for supplying an output DC voltage Vo to a load 20; a resistor 15 and a capacitor 16 connected in series to each other in parallel relation to the inductor 13; and a hysteresis comparison circuit 18 for comparing a voltage Vx at the connecting point between the resistor 15 and the capacitor 16 with a reference voltage Vrf from a reference voltage source 17. The DC-DC converter uses an output from the hysteresis comparison circuit 18 to cause the ON/OFF operation of the switch element 11. The hysteresis comparison circuit 18 has a hysteresis voltage Vh and turns ON the switch element 11 when the voltage Vx at the connecting point between the resistor 15 and the capacitor 16 becomes not more than the reference voltage Vrf, while turning OFF the switch element 11 when the connecting-point voltage Vx becomes not less than a voltage (reference voltage Vrf+hysteresis voltage Vh).

A description will be given herein below to the operation of the DC-DC converter of FIG. 6.

First, when the switch element 11 is in the ON state, the voltage difference (Vi−Vo) between the input DC voltage Vi and the output DC voltage Vo is applied to the inductor 13 so that a linearly increasing current flows. The capacitor 16 is charged so that the voltage Vx at the connecting point Vx between the resistor 15 and the capacitor 16 rises. When the connecting-point voltage Vx eventually reaches the voltage (reference voltage Vrf+hysteresis voltage Vh), the hysteresis comparison circuit 18 turns OFF the switch elemenet 11. Then, when the switch element 11 is in the OFF state, the output DC voltage Vo is applied to the inductor 13 so that a linearly decreasing current flows. The capacitor 16 is discharged so that the voltage Vx at the connecting point between the resistor 15 and the capacitor 16 drops. When the connecting-point voltage Vx eventually reaches the reference voltage Vrf, the hysteresis comparison circuit 18 turns ON the switch elemenet 11. By repeating the operation described above, the voltage Vx at the connecting point between the resistor 15 and the capacitor 16 is controlled to upwardly and downwardly fluctuate between the reference voltage Vrf and the voltage (reference voltage Vrf and hysteresis voltage Vh).

Since the output DC voltage Vo is immediately transmitted to the hysteresis comparison circuit 18 via the capacitor 16, the transient response characteristic is excellent and the output ripple voltage can also be set to a low level.

In the DC-DC converter having such a structure, however, the output DC voltage Vo is not directly stabilized and a DC voltage superimposed on an output voltage from the capacitor 16 is present. This has caused the problem of degraded stability.

SUMMARY OF THE INVENTION

The present invention aims at solving the problem of the prior art technology described above and it is therefore an object of the present invention to provide a DC-DC converter which implements a high-speed response characteristic by using a structure based on the operation of a comparison circuit and without using an error amplifier and also allows the achievement of high-precision output stability without increasing an output ripple voltage.

To attain the object mentioned above, a DC-DC converter according to an aspect of the present invention is a DC-DC converter for converting an input DC voltage to an output DC voltage, the DC-DC converter including: a switch element which is turned ON/OFF by a drive signal; a reference voltage source for outputting a first reference voltage when the switch element is ON and outputting a second reference voltage when the switch element is OFF; a capacitive element having one terminal connected to the reference voltage source; a charge/discharge circuit for discharging the capacitive element when the switch element is ON and charging the capacitive element when the switch element is OFF; a switch circuit for short-circuiting the capacitive element when the switch element is turned ON or OFF; and a comparison circuit for comparing the output DC voltage or a voltage at which the output DC voltage is detected with a voltage at the other terminal of the capacitive element and generating the drive signal.

In the DC-DC converter according to the aspect of the present invention, the reference voltage source, the charge/ discharge circuit, or the switch circuit operates based on the drive signal when the switch element is ON, OFF, turned ON, and turned OFF.

The DC-DC according to the aspect of the present invention further includes: an inductor to which a differential voltage between the input DC voltage and the output DC voltage is applied when the switch element is ON and the output DC voltage is applied when the switch element is OFF, wherein the charge/discharge circuit discharges the capacitive element with a current based on the differential voltage between the input DC voltage and the output DC voltage when the switch element is ON or charges the capacitive element with a current based on the output DC voltage when the switch element is OFF.

In the DC-DC converter according to the aspect of the present invention, the charge/discharge circuit discharges the capacitive element with a current directly proportional to the differential voltage between the input DC voltage and the output DC voltage when the switch element is ON and charges the capacitive element with a current directly proportional to the output DC voltage when the switch element is OFF.

In the DC-DC converter according to the aspect of the present invention, the reference voltage source increases a differential voltage between the first and second reference voltages as the input DC voltage is higher.

In the DC-DC converter according to the aspect of the present invention, the reference voltage source increases the first reference voltage as the input DC voltage is higher.

With the structure of the DC-DC converter according to the aspect of the present invention described above, the output DC voltage or the voltage at which the output DC voltage is detected can be controlled to an intermediate value between the first and second reference voltages. When the input DC voltage becomes high, the first reference voltage is controlled to be higher, thereby suppressing fluctuations in switching frequency. A high-speed response is enabled by using a structure based on the operation of the comparison circuit and without using an error amplifier and high-precision output stability can also be achieved without increasing the output ripple voltage.

DETAILED DESCRIPTION OF THE INVENTION

Figure 1:
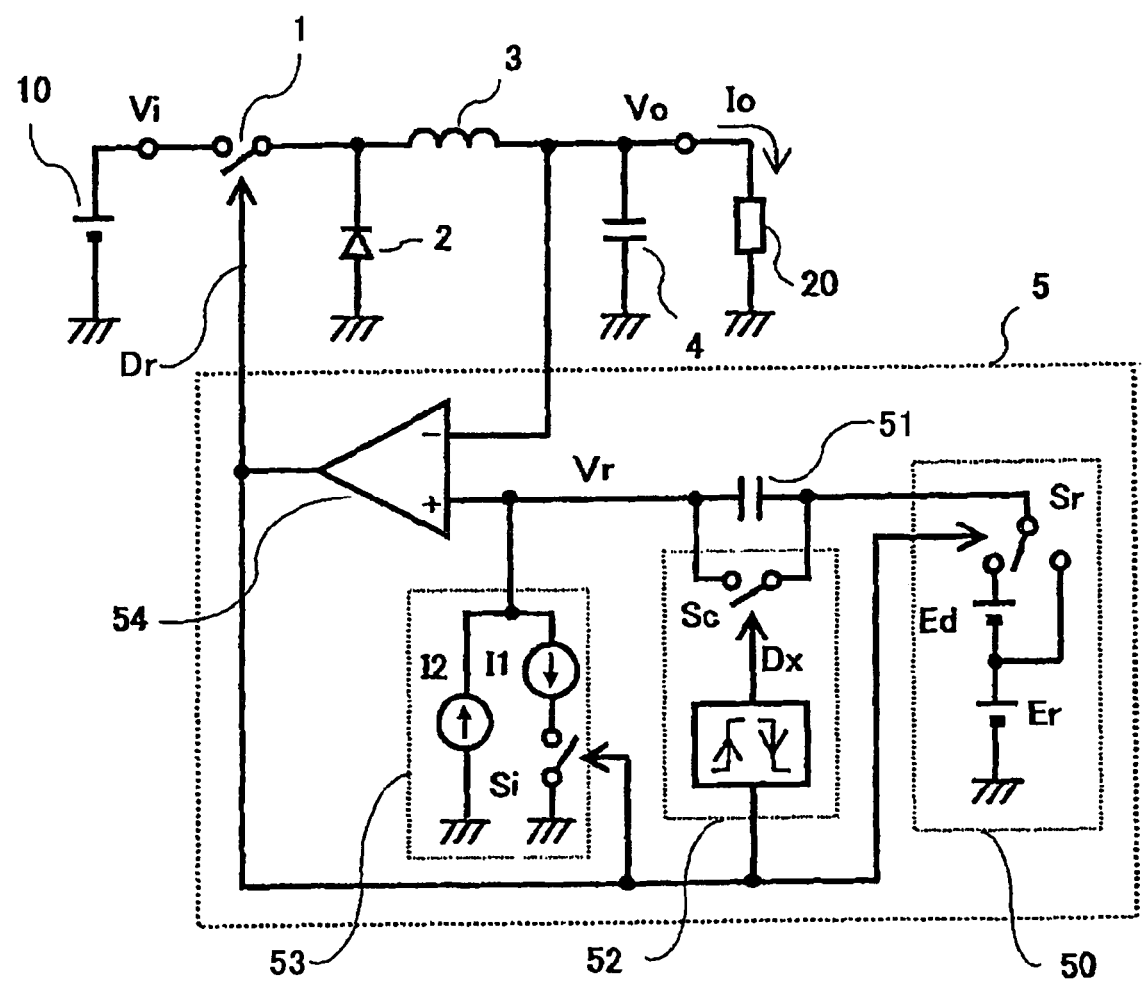
FIG. 1 is a view showing a circuit structure of a DC-DC converter according to a first embodiment of the present invention.

Referring now to the drawings, the individual embodiments of the present invention will be described herein below.

FIG. 1 is a view showing a circuit structure of a DC-DC converter according to the first embodiment of the present invention.

In FIG. 1, an input DC voltage source 10 such as a battery supplies an input DC voltage Vi. A switch element 1 is connected to the input DC voltage source 10 and is turned ON/OFF by a drive signal Dr. Rectifying means 2 is a diode having a cathode connected to the switch element 1 and an anode grounded. An inductor 3 has one terminal connected to the connecting point between the switch element 1 and the diode 2. The inductance of the inductor 3 is assumed to be L. An output capacitor 4 as smoothing means is connected to the other terminal of the inductor 3 to supply an output DC voltage Vo to a load 20. A control circuit 5 detects the output DC voltage Vo and outputs the drive signal Dr to the switch element 1 for the stabilization of the output DC voltage Vo.

In the control circuit 5 shown in FIG. 1, a reference voltage source 50 has a switch Sr switched by the drive signal Dr. When the drive signal Dr is at the H level, the reference voltage source 50 outputs a first reference voltage (Er+Ed). When the drive signal Dr is at the L level, the reference voltage source 50 outputs a second reference voltage Er. A capacitor 51 has one terminal connected to the output of the reference voltage source 50. In a switch circuit 52, the switch Sc short-circuits the capacitor 51 on each of the rising and falling edges of the drive signal Dr. A charge/discharge circuit 53 has a switch Si switched by the drive signal Dr. When the drive signal Dr is at the L level, the charge/discharge circuit 53 charges the capacitor 51 with a second current I2. When the drive signal Dr is at the H level, the charge/discharge circuit 53 discharges the capacitor 51 to supply a differential current (I1−I2) between a first current I1 and the second current I2. A comparison circuit 54 receives each of the output DC voltage Vo and a voltage Vr at the other terminal of the capacitor 51 and outputs the drive signal Dr.

Figure 2:
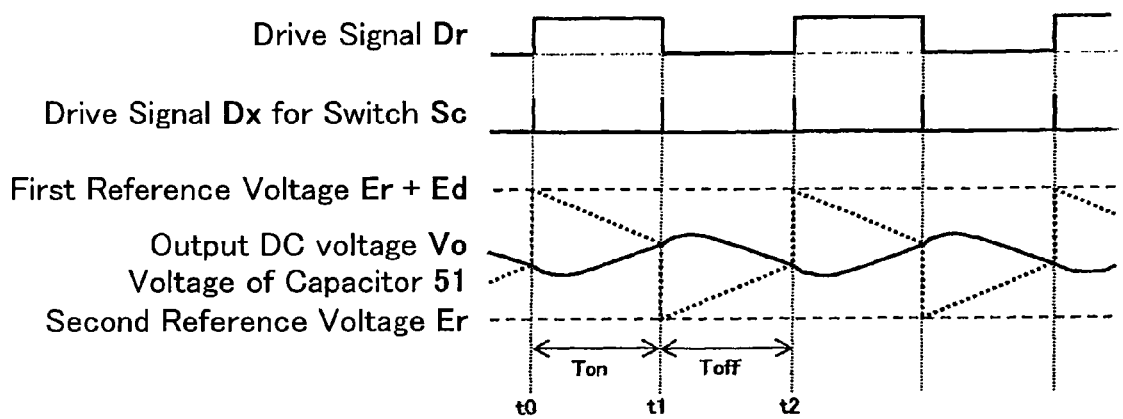
FIG. 2 is a view illustrating waveforms in the principal portion of the control circuit of the DC-DC converter according to the first embodiment.

FIG. 2 is a view illustrating waveforms in the principal portion of the control circuit of the DC-DC converter according to the first embodiment. FIG. 2 shows the drive signal Dr, a signal Dx for driving the switch Sc of the switch circuit 52, the first reference voltage (Er+Ed), the second reference voltage Er, the output DC voltage Vo, and the voltage Vr.

A description will be given herein below to an operation in which the control circuit 5 of the DC-DC converter according to the first embodiment thus constructed adjusts the ON-time of the switch element 1 and the OFF-time thereof to stabilize the output DC voltage Vo with reference to FIGS. 1 and 2.

First, when the switch element 1 is turned ON at the time t0, the voltage difference (Vi−Vo) between the input DC voltage Vi and the output DC voltage Vo is applied to the inductor 3 so that a current increasing in accordance with (Vi−Vo)×t/L flows. The drive signal Dr rises to the H level and the reference voltage source 50 outputs the first reference voltage (Er+Ed). The capacitor 51 is short-circuited by the switch Sc of the switch circuit 52 when the switch element 1 is turned ON and then further discharged to supply a constant current (I1−I2) by the charge/discharge circuit 53. Accordingly, the voltage Vr at the other terminal of the capacitor 51 monotonously decreases from the first reference voltage (Er+Ed).

On the other hand, when the switch element 1 is in the ON state, the output DC voltage Vo undergoes a drop due to the ESR (Equivalent Series Resistance) of the output capacitor 4 as an operation in the output capacitor 4 as the smoothing means shifts from discharging to charging with the linearly increasing inductor current, so that a ripple voltage waveform shifting from a decrease to an increase is superimposed. When the output DC voltage Vo eventually intersects the voltage Vr at the time t1, the comparison circuit 54 inverts the drive signal Dr to the L level, thereby turning OFF the switch element 1. At the same time, the output of the reference voltage source 50 drops to the second reference voltage Er and the switch circuit 52 short-circuits the capacitor 51, so that the charge/discharge circuit 53 starts to charge the capacitor 51 with the second current I2.

When the switch element 1 is in the OFF state, the output DC voltage Vo is applied to the inductor 3 so that a current decreasing in accordance with (−Vo×t/L) flows. The capacitor 51 linearly rises from the second reference voltage Er. On the other hand, the output DC voltage Vo undergoes a drop due to the ESR of the output capacitor 4 as an operation in the output capacitor 4 as the smoothing means shifts from charging to discharging with the linearly decreasing inductor current, so that the ripple voltage waveform shifting from an increase to a decrease is superimposed.

When the output DC voltage Vo eventually intersects the voltage Vr at the time t2, the comparison circuit 54 inverts the drive signal Dr to the H level, thereby turning ON the switch element 1. At the same time, the output of the reference power source 50 increases to the first reference voltage (Er+Ed) and the switch circuit 52 short-circuits the capacitor 51, so that the charge/discharge circuit 53 starts to discharge the capacitor 51 to supply the constant current (I1−I2). By repeating the operation described above, the output DC voltage Vo is controlled to be held between the first reference voltage (Er+Ed) and the second reference voltage Er.

If it is assumed herein that each of the components is an ideal element having a resistance component that can be ignored, the ON-time of the switch element 1 is Ton, the OFF-time thereof is Toff, and the switching frequency thereof is f, the output DC voltage Vo is given by Numerical Expression 1.

$$Vo = \frac{Vi + Ton}{(Ton + Toff)} = Vi \times Ton \times f \qquad \text{Numerical Expression 1}$$

From Numerical Expression 1, Ton and Toff are derived, which are given by Numerical Expression 2.

$$Ton = \frac{Vo}{Vi \times f} \qquad \text{Numerical Expression 2}$$

$$Toff = \frac{(Vi - Vo)}{Vi \times f}$$

If the electrostatic capacitance of the capacitor 51 is assumed to be C, the voltage Vr at the time t1 and the voltage Vr at the time t2 are given by Numerical Expressions 3 and 4, respectively.

$$Vr1 = Er + Ed - \frac{(I1 - I2) \times Ton}{C} = \qquad \text{Numerical Expression 3}$$

$$Er + Ed - \frac{(I1 - I2) \times Vo}{Vi \times C \times f}$$

$$Vr2 = Er + \frac{I2 \times Toff}{C} = Er + \frac{I2 \times (Vi - Vo)}{Vi \times C \times f} \qquad \text{Numerical Expression 4}$$

If it is assumed that the ripple voltage component of the output DC voltage Vo can be ignored, Vo=Vr1=Vr2 is satisfied. If it is assumed that I1=2×I2 is satisfied for the sake of simplification, Numerical Expression 5 is derived.

$$Vo = \frac{(Er + Ed)}{\left(1 + \frac{Ed}{Vi}\right)} \qquad \text{Numerical Expression 5}$$

$$f = \frac{I2}{C \times Ed}$$

When the input DC voltage Vi is equal to the second reference voltage Er (Vi=Er), Vo=Er is satisfied. When the input DC voltage Vi is infinite, Vo=Er+Ed is satisfied. Accordingly, in a normal operation, the output DC voltage Vo is held within the range given by Numerical Expression 6.

$$Er < Vo < (Er + Ed) \qquad \text{Numerical Expression 6}$$

If it is assumed that Vi=2 to 5 V, Er=0.98 V, Ed=0.04 V, I2=4 µA, and C=100 pF are satisfied, Vo=1 to 1.012 V and f=1 MHz are satisfied.

Figure 3:
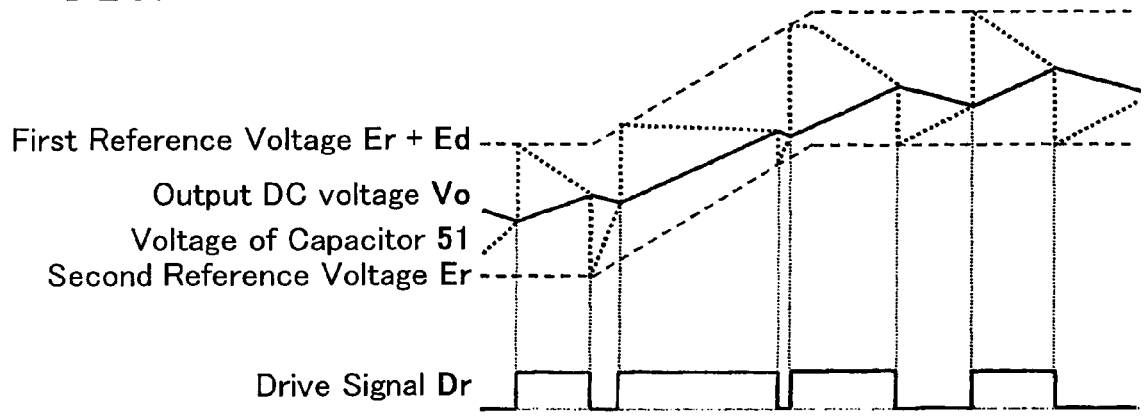
FIG. 3 is a view illustrating the operation waveform of a transient response characteristic in the first embodiment.

FIG. 3 is a view illustrating the operation waveform of a transient response characteristic in the first embodiment, which shows the case where the output DC voltage Vo is increased by increasing the reference voltage Er. As shown in FIG. 3, the switch element 1 is turned ON/OFF through a direct comparison between the output DC voltage Vo and each of the first reference voltage (Er+Ed) and the second reference voltage Er by the comparison circuit 54, so that a high-speed response is obtained.

Thus, the DC-DC converter according to the first embodiment excellently stabilizes the output DC voltage Vo with a low-output ripple voltage and is also capable of a high-speed response.

Figure 4:
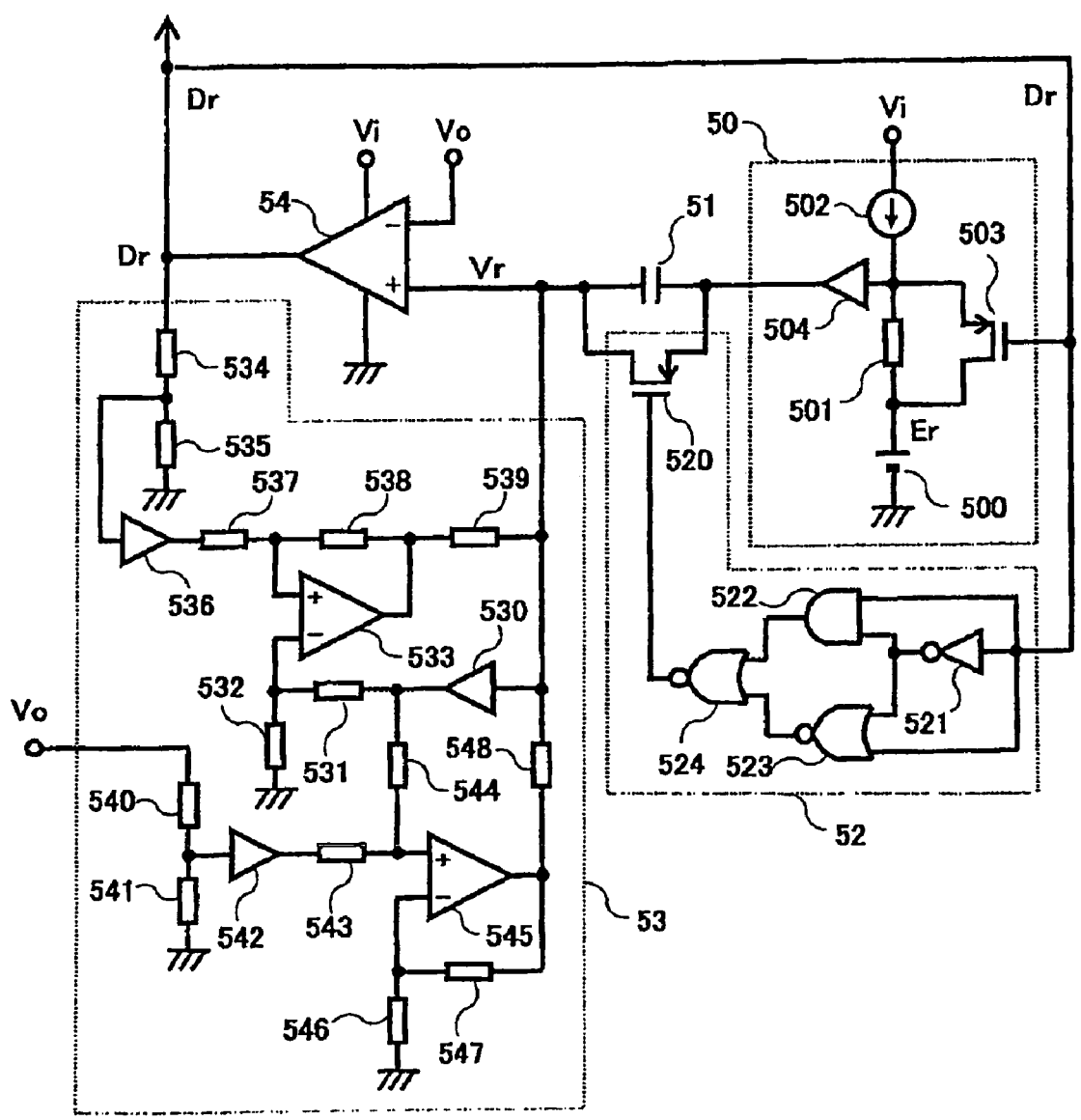
FIG. 4 is a view showing the structure of the control circuit of a DC-DC converter according to a second embodiment of the present invention.

FIG. 4 is a view showing the structure of the control circuit of a DC-DC converter according to the second embodiment of the present invention. In FIG. 4, only the control circuit 5 is shown, while the depiction of the input DC voltage source 10, the switch element 1, the diode 2, the inductor 3, the output capacitor 4, and the load 20 each shown in FIG. 1 is omitted. Of the control circuit 5 of the DC-DC converter according to the second embodiment shown in FIG. 4, the components which are the same as those of the DC-DC converter according to the first embodiment are denoted by the same reference numerals and the description thereof will be omitted.

The structure of the DC-DC converter according to the second embodiment is different from that of the DC-DC converter according to the first embodiment shown in FIG. 1 in that the reference voltage source 50 and a switch circuit 52 are shown more specifically and that the charge/discharge currents of the charge/discharge circuit 53 are imparted with dependence on the input DC voltage Vi and the output DC voltage Vo.

In the reference voltage source 50 shown in FIG. 4, a reference voltage source 500 generates the second reference voltage Er. A resistor 501 having a resistance value Rr is connected to the reference voltage source 500. A current source 502 supplies a current Ir to the resistor 501. A PMOS transistor 503 has a gate to which the drive signal Dr is applied. A buffer circuit 504 outputs a voltage obtained by adding a voltage drop resulting from the resistor 501 to the second reference voltage Er. In such a structure, when the drive signal Dr is at the H level, the PMOS transistor 503 is turned OFF so that the buffer circuit 504 outputs the first reference voltage (Er+Ed) obtained by adding the voltage drop Ir×Rr=Ed resulting from the resistor 501 to the second reference voltage Er. When the drive signal Dr is at the L level, the PMOS transistor 503 is turned ON and the resistor 501 is short-circuited so that the buffer circuit 504 outputs the second reference voltage Er.

In the switch circuit 52 shown in FIG. 4, a PMOS transistor 520 is connected to short-circuit the capacitor 51. An inverter 521 outputs an inversion signal obtained by delaying the drive signal Dr. To an AND gate 522, the output of the inverter 521 and the drive signal Dr are inputted. To a NOR gate 523, the output of the inverter 521 and the drive signal Dr are inputted. To a NOR gate 524, the output of the AND gate 522 and the output of the NOR gate 523 are inputted. The output of the NOR gate 524 is applied to the gate of the PMOS transistor 520. In such a structure, the NOR gate 524 applies a signal, which stays at the L level only for a short period of time on each of the rising and falling edges of the drive signal Dr, to the gate of the PMOS transistor 520, thereby turning ON the PMOS transistor 520 and short-circuiting the capacitor 51.

In the charge/discharge circuit 53 shown in FIG. 4, a buffer circuit 530 receives the voltage Vr of the capacitor 51 and outputs it. Resistors 531 and 532 divide the voltage Vr. To the inverted input terminal of an operational amplifier 533, the voltage at the connecting point between the resistors 531 and 532, i.e., a voltage obtained by dividing the voltage Vr is applied. Resistors 534 and 535 divide the drive signal Dr. A buffer circuit 536 receives the voltage at the connecting point between the resistors 534 and 535 and outputs it. A resistor 538 has one terminal to which the output of the buffer circuit 536 is applied and the other terminal connected to the non-inverted input terminal of the operational amplifier 533. A resistor 537 is connected between the non-inverted input terminal of the operational amplifier 533 and the output thereof. A resistor 539 has one terminal to which the voltage Vr is applied and the other terminal connected to the output of the operational amplifier 533.

If the voltage division ratio of the resistors 534 and 535 is assumed to be α, the signal outputted from the buffer circuit 536 is (α×Dr). If it is assumed that the resistors 531 and 532 have equal resistance values and the resistors 537 and 538 have equal resistance values, the output of the operational amplifier 533 is (Vr−α×Dr) so that (α×Dr) is generated at each of the both terminals of the resistor 539. The comparison circuit 54 has been biased with the input DC voltage Vi and the H level of the drive signal Dr is the input DC voltage Vi, while the L level thereof is a zero voltage. If the resistance value of the resistor 539 is assumed to be R, the current I1 flowing from the voltage Vr via the resistor 539 satisfies (I1=α×Vi/R) when the drive signal Dr is at the H level, while it satisfies (I1=0) when the drive signal Dr is at the L level.

In the charge/discharge circuit 53 of FIG. 4, resistors 540 and 541 divide the output DC voltage Vo. A buffer circuit 542 receives the voltage at the connecting point between the resistors 540 and 541 and outputs it. A resistor 543 has one terminal connected to the buffer circuit 542. A resistor 544 is connected between the other terminal of the resistor 543 and the output of the buffer circuit 530. To the non-inverted input terminal of an operational amplifier 545, the voltage at the connecting point between the resistors 543 and 544 is applied. A resistor 546 has one terminal grounded and the other terminal connected to the inverted input terminal of the operational amplifier 539. A resistor 547 is connected between the inverted input terminal of the operational amplifier 545 and the output thereof. A resistor 548 has one terminal to which the voltage Vr is applied and the other terminal connected to the output of the operational amplifier 539.

If the voltage division ratio of the resistors 540 and 541 is assumed to be a, a signal outputted from the buffer circuit 542 is (α×Vo). If it is assumed that the resistors 543 and 544 have equal resistance values and the resistors 546 and 547 have equal resistance values, the output of the operational amplifier 545 is (Vr+α×Vo) so that (α×Vo) is generated at each of the both terminals of the resistor 548. If the resistance value of the resistor 548 is assumed to be R, the current I2 flowing from the voltage Vr via the resistor 548 satisfies (I2=α×Vo/R).

In the charge/discharge circuit 35 having a structure as described above, when the drive signal Dr is at the H level, i.e., when the switch element 1 is ON, the capacitor 51 is discharged to supply a current given by Numerical Expression 7.

$$I1 - I2 = \frac{\alpha \times (Vi - Vo)}{R} \qquad \text{Numerical Expression 7}$$

When the drive signal Dr is at the L level, i.e., when the switch element 1 is OFF, the capacitor 51 is charged with a current given by Numerical Expression 8.

$$I2 = \frac{\alpha \times Vo}{R} \qquad \text{Numerical Expression 8}$$

If the electrostatic capacitance of the capacitor 51 is assumed to be C, the voltage Vr at the time t1 and the voltage Vr at the time t2 are given by Numerical Expressions 9 and 10, respectively.

$$Vr1 = Er + Ed - \frac{(I1 - I2) \times Ton}{C} = \qquad \text{Numerical Expression 9}$$
$$Er + Ed - \frac{\alpha \times (Vi - Vo) \times Vo}{Vi \times C \times R \times f}$$

$$Vr2 = Er + \frac{I2 \times Toff}{C} = Er + \frac{\alpha \times (Vi - Vo) \times Vo}{Vi \times C \times R \times f} \qquad \text{Numerical Expression 10}$$

If it is assumed herein that the ripple voltage component of the output DC voltage Vo can be ignored, Vo=Vr1=Vr2 is satisfied so that the relationship given by Numerical Expression 11 is obtained.

$$Vo = Er + \frac{Ed}{2} \qquad \text{Numerical Expression 11}$$
$$f = \frac{2\alpha \times (Vi - Vo) \times Vo}{Vi \times Ed \times C \times R}$$

Accordingly, the switching frequency f fluctuates depending on input/output conditions but the output DC voltage Vo is stabilized at a constant value during a normal operation. For example, if is assumed that Vi=2 to 5 V, Er=0.98 V, Ed=0.04 V, α=0.2, R=50 kΩ, and C=100 pF are satisfied, Vo=1 V and f=1 to 1.6 MHz are satisfied.

Thus, the DC-DC converter according to the second embodiment excellently stabilizes the output DC voltage Vo with a low-output ripple voltage and is also capable of a high-speed response.

Figure 5:
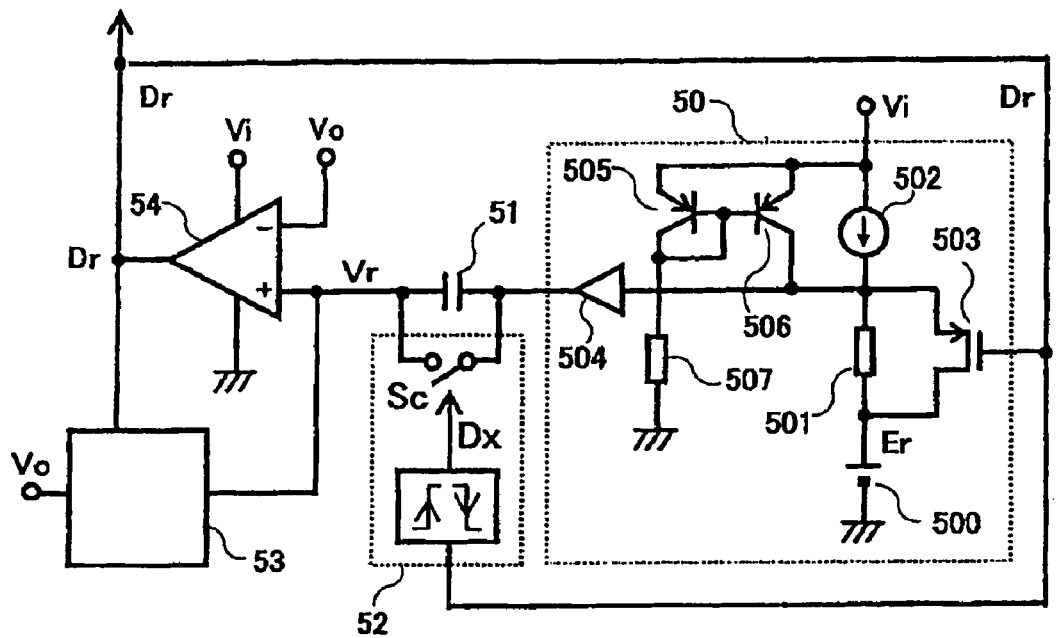
FIG. 5 is a view showing the structure of the control circuit of a DC-DC converter according to a third embodiment of the present invention.
Figure 6:
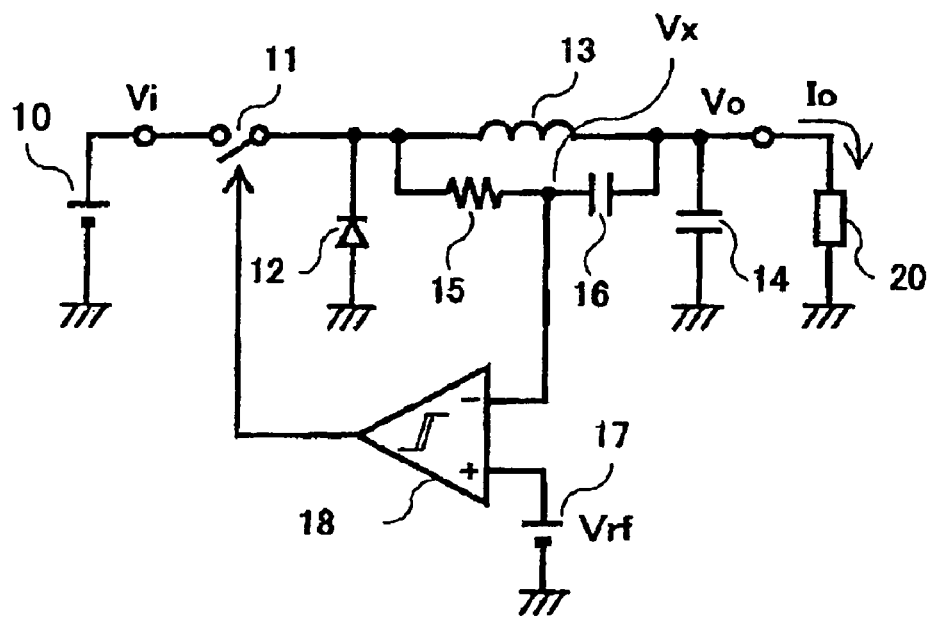
FIG. 6 is a view showing a circuit structure of a conventional DC-DC converter.

FIG. 5 is a view showing the structure of the control circuit of a DC-DC converter according to the third embodiment of the present invention. In FIG. 5, the reference voltage source 50, the capacitor 51, and the comparison circuit 54 are shown, while the depiction of the input DC voltage source 10, the switch element 1, the diode 2, the inductor 3, the output capacitor 4, and the load 20 each shown in FIG. 1 is omitted. The switch circuit 52 and the charge/discharge circuit 53 each shown in FIG. 4 are depicted only schematically in FIG. 5, since they have the same structures as in FIG. 4.

Of the reference voltage source 50 in the control circuit of the DC-DC converter according to the third embodiment shown in FIG. 5, the components which are the same as those of the DC-DC converter according to the second embodiment are denoted by the same reference numerals and the description thereof will be omitted.

The DC-DC converter according to the third embodiment is different from the DC-DC converter according to the second embodiment shown in FIG. 4 in that a current mirror circuit composed of PNP transistors 505 and 506 and a resistor 507 are added to allow a current to flow from the input DC voltage Vi of the reference voltage source 50 to the resistor 501.

If it is assumed that the emitter-base voltage of each of the PNP transistors is Vbe and the resistor value of the resistor 507 is R7, the current Ir from the current source 502 and a current of (Vi−Vbe)/R7 from the PNP transistor 506 flow to the resistor 501 (resistance value Rr). Therefore, the first reference voltage is given by Numerical Expression 12.

$$Er + Ed = Er + \left(Ir + \frac{(Vi - Vbe)}{R7}\right) \times Rr \quad \text{Numerical Expression 12}$$

Thus, a structure is obtained in which the fluctuation width Ed of the reference voltage increases as the input DC voltage Vi is higher.

For example, if it is assumed that Vi=2 to 5 V, Er=0.98 V, α=0.2, R=50 kΩ, C=100 pF, Ir=8 μA, Rr=3.7 kΩ, Vbe=0.7 V, and R7=925 kΩ are satisfied, Vo=1 t 1.006 V and f=1 to 1.231 MHz are satisfied.

Thus, the DC-DC converter according to the third embodiment not only offers the advantages of the DC-DC converter according to the second embodiment such as the capability of a high-speed response in addition to the high-precision stabilization of the output DC voltage Vo with a low-output ripple voltage but also allows the suppression of fluctuations in switching frequency by correcting the fluctuation width Ed of the reference voltage.

Although the first to third embodiments have been described by using a step-down converter by way of example, the DC-DC converter according to the present invention is not limited thereto. The present invention is applicable to any switching DC-DC converter having a switch element such that the output voltage thereof rises during the period in which the switch element is ON.

Although the description has been given thus far by using the diode as the rectifying means, the DC-DC converter according to the present invention is not limited thereto. The rectifying means may also be a synchronous rectifier circuit.

The DC-DC converter according to the present invention implements a high-speed response characteristic by using a structure based on the operation of the comparison circuit and without using an error amplifier and also allows the achievement of high-precision output stability without increasing the output ripple voltage. Therefore, the DC-DC converter according to the present invention is useful for the power source circuit of various electronic equipment which supplies a stable output DC voltage in rapid response to a change in input/output conditions or the like.

What is claimed is:

1. A DC-DC converter for converting an input DC voltage to an output DC voltage, the DC-DC converter comprising:
   a switch element which is turned ON/OFF by a drive signal;
   a reference voltage source for outputting a first reference voltage when the switch element is ON and outputting a second reference voltage when the switch element is OFF;
   a capacitive element having one terminal connected to the reference voltage source;
   a charge/discharge circuit for discharging the capacitive element when the switch element is ON and charging the capacitive element when the switch element is OFF;
   a switch circuit for short-circuiting the capacitive element when the switch element is turned ON or OFF; and
   a comparison circuit for comparing the output DC voltage or a voltage at which the output DC voltage is detected with a voltage at the other terminal of the capacitive element and generating the drive signal.

2. The DC-DC converter of claim 1, wherein
   the reference voltage source, the charge/discharge circuit, or the switch circuit operates based on the drive signal when the switch element is ON, OFF, turned ON, and turned OFF.

3. The DC-DC converter of claim 1, further comprising:
   an inductor to which a differential voltage between the input DC voltage and the output DC voltage is applied when the switch element is ON and the output DC voltage is applied when the switch element is OFF, wherein
   the charge/discharge circuit discharges the capacitive element with a current based on the differential voltage between the input DC voltage and the output DC voltage when the switch element is ON and charges the capacitive element with a current based on the output DC voltage when the switch element is OFF.

4. The DC-DC converter of claim 3, wherein the charge/discharge circuit discharges the capacitive element with a current directly proportional to the differential voltage between the input DC voltage and the output DC voltage when the switch element is ON and charges the capacitive element with a current directly proportional to the output DC voltage when the switch element is OFF.

5. The DC-DC converter of claim 1, wherein the reference voltage source increases a differential voltage between the first and second reference voltages as the input DC voltage is higher.

6. The DC-DC converter of claim 1, wherein the reference voltage source increases the first reference voltage as the input DC voltage is higher.

* * * * *